(12) United States Patent
Lifson et al.

(10) Patent No.: US 8,373,099 B2
(45) Date of Patent: Feb. 12, 2013

(54) HEAT PUMP WITH HEAT RECOVERY

(75) Inventors: Alexander Lifson, Manlius, NY (US); Michael F. Taras, Fayetteville, NY (US)

(73) Assignee: Carrier Corporation, Farmington, CT (US)

( * ) Notice: Subject to any disclaimer, the term of this patent is extended or adjusted under 35 U.S.C. 154(b) by 276 days.

(21) Appl. No.: 12/682,131

(22) PCT Filed: Nov. 6, 2007

(86) PCT No.: PCT/US2007/023354
§ 371 (c)(1),
(2), (4) Date: Apr. 8, 2010

(87) PCT Pub. No.: WO2009/061292
PCT Pub. Date: May 14, 2009

(65) Prior Publication Data
US 2010/0206868 A1    Aug. 19, 2010

(51) Int. Cl.
*H05B 3/02* (2006.01)

(52) U.S. Cl. ........... 219/476; 219/449.1; 62/238.6; 62/186; 62/187; 165/205; 165/210; 165/214; 165/216; 429/434; 429/436; 165/48.1; 165/58

(58) Field of Classification Search .......... 219/476, 219/449.1; 62/238.6, 186, 187; 165/205, 165/210, 214, 216, 48.1, 58; 429/434, 436
See application file for complete search history.

(56) References Cited

U.S. PATENT DOCUMENTS

| | | | |
|---|---|---|---|
| 5,985,474 A * | 11/1999 | Chen et al. | 429/410 |
| 6,054,229 A * | 4/2000 | Hsu et al. | 165/48.1 |
| 6,454,180 B2 * | 9/2002 | Matsunaga et al. | 237/12.3 B |
| 6,746,790 B2 * | 6/2004 | Colborn | 429/434 |
| 6,849,052 B2 * | 2/2005 | Uchigaki et al. | 600/584 |
| 6,865,901 B2 * | 3/2005 | Horn et al. | 62/238.6 |
| 6,986,387 B2 * | 1/2006 | Hancock | 165/260 |
| 7,063,139 B2 * | 6/2006 | Horn et al. | 165/203 |
| 7,067,208 B2 * | 6/2006 | Gottmann et al. | 429/465 |

(Continued)

FOREIGN PATENT DOCUMENTS

| | | |
|---|---|---|
| CN | 1231068 | 10/1999 |
| DE | 19925443 | 12/2000 |

(Continued)

OTHER PUBLICATIONS

Fuel Cell Cogeneration System: A Case of Technoeconomic Analysis, J.L. Silveria, L.A. Gomes, Mar. 30, 1997, 10 pgs.

(Continued)

*Primary Examiner* — Viet Q Nguyen
(74) *Attorney, Agent, or Firm* — Cantor Colburn LLP

(57) ABSTRACT

A fuel cell is provided to furnish electrical power to an HVAC&R system, and the waste heat from the fuel cell is transferred to a secondary fluid directed to flow to the climate-controlled space of a building during periods of time in which heating is required. The heat rejected by the fuel cell may be a supplemental or primary source of heat as well used for precise temperature control within the climate-controlled space of the building. A channeling assembly is used to selectively direct the fuel cell heat either to and/or away from the climate-controlled space served by the HVAC&R system. Higher energy efficiencies of the HVAC&R equipment are achieved, and the "cold blow" phenomenon is reduced or eliminated.

36 Claims, 2 Drawing Sheets

U.S. PATENT DOCUMENTS

| | | | |
|---|---|---|---|
| 7,191,858 B2 * | 3/2007 | Vanderwees et al. | 180/65.31 |
| 7,374,001 B2 * | 5/2008 | Uozumi et al. | 180/65.31 |
| 7,395,854 B2 * | 7/2008 | Schmidt et al. | 165/287 |
| 7,600,391 B2 * | 10/2009 | Naik et al. | 62/238.6 |
| 7,730,734 B2 * | 6/2010 | Hoshi et al. | 62/244 |
| 7,845,187 B2 * | 12/2010 | Patel et al. | 62/259.2 |
| 8,119,300 B2 * | 2/2012 | Tsuchiya et al. | 429/434 |
| 2004/0000161 A1 * | 1/2004 | Khelifa et al. | 62/324.1 |
| 2005/0092005 A1 | 5/2005 | Wunderlich et al. | |
| 2006/0112695 A1 * | 6/2006 | Neubauer et al. | 60/714 |
| 2007/0012052 A1 * | 1/2007 | Butler et al. | 62/181 |
| 2007/0283703 A1 * | 12/2007 | Heckt et al. | 62/3.61 |
| 2009/0283604 A1 * | 11/2009 | Martinchick et al. | 237/12.3 B |
| 2009/0305097 A1 * | 12/2009 | Kaupert | 429/19 |

FOREIGN PATENT DOCUMENTS

| | | |
|---|---|---|
| EP | 1527919 | 4/2005 |

OTHER PUBLICATIONS

Optimization of an SOFC-Based Decentralized Polygeneration System for Providing Energy Services in an Office-Building in Tokyo, Celine Weber, Francois Marechal, Daniel Favrat, Steven Kraines, May 31, 2005, 11 pgs.

International Preliminary Report on Patentability mailed May 20, 2010 (8 pgs.).

* cited by examiner

US 8,373,099 B2

HEAT PUMP WITH HEAT RECOVERY

TECHNICAL FIELD

This invention relates generally to heat pumps and water heaters and, more particularly, to use of a fuel cell therewith

BACKGROUND OF THE INVENTION

Fuel cells are beginning to gain a foothold as a source of electricity for heating, ventilation, air conditioning and refrigeration equipment (HVAC&R). Thus, a fuel cell may be used as a primary source of electricity, such as in isolated areas where an electric utility is not reliably established, such that all of the electrical power to an HVAC&R system is provided by the fuel cell alone. It may also be used as a supplementary source of electricity during emergencies such as, for example, blackouts or power failures due to weather conditions and the like as well as during excessive loading of the power grid or limitations of existing conventional power supplies.

At present, fuel cells are approximately 40-50% efficient, so there is a substantial amount of heat generated by the fuel cell during its operation. A large percentage of this heat may be lost as waste heat. Some components of fuel cells operate at high temperatures and, at certain operating conditions, may even require special cooling systems.

Heating systems that are installed in commercial buildings, residences, restaurants, hospitals and the like are of various types which include heat pumps, hydronic or hot water systems, steam systems, and hot water heaters. In the case of hydronic/hot water heat, steam heat and hot water heaters, the source of heat is commonly natural gas, fuel oil or the like, which, in recent years, has become relatively expensive. In the case of heat pumps, it is typically electrical energy that is utilized to power heat pump components such as compressors, fans, liquid pumps and controls. However, in such systems, a phenomenon known as "cold blow" occurs and is typically associated with low temperature ambient conditions. During these periods of time, it is necessary to operate electrical resistance heaters or strip heaters to supplement the primary heat pump heating system and to heat the air to a desired temperature that would otherwise enter a heated space and be sensed by an occupant of that heated spaces as an uncomfortably "cold air".

What is needed is a method/apparatus for reducing the "cold blow" phenomenon and for the efficient recovery of heat that might otherwise be lost as waste heat.

DISCLOSURE OF THE INVENTION

A fuel cell is provided as a primary or supplemental electrical power source for an HVAC&R system and, during periods in which heat is required, waste heat from the fuel cell is directed to supplement the heat provided by the heat pump and/or hydronic system.

A method provides for the use of a fuel cell to power HVAC&R equipment and the use of the waste heat from the fuel cell to provide additional heat to supplement heat provided by a heat pump and/or hydronic system during periods of time when this additional heat is need.

In the drawings as hereinafter described, a preferred embodiment is depicted; however, various other modifications and alternate constructions can be made thereto without departing from the spirit and scope of the invention.

DETAILED DESCRIPTION OF THE INVENTION

Figure 1:
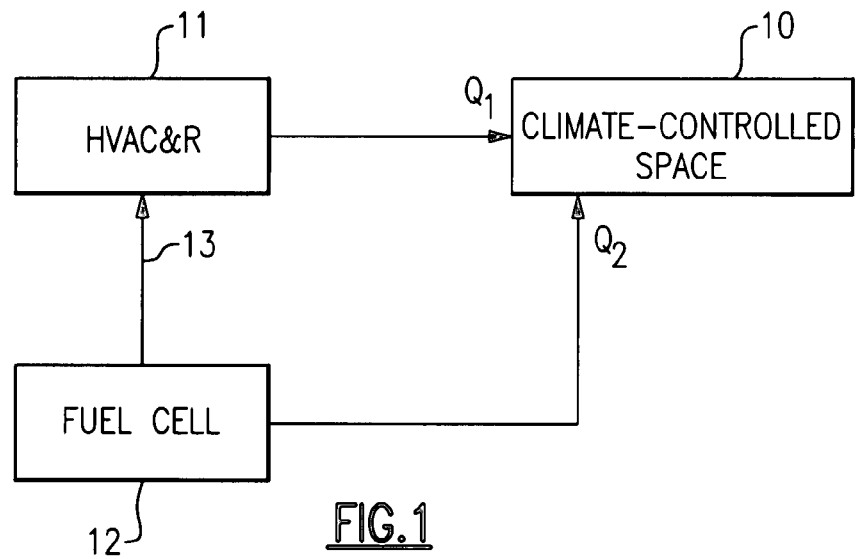
FIG. 1 is a schematic illustration of the present invention incorporated into an HVAC&R system.

Schematically shown in FIG. 1 is a typical HVAC system 11 that may be installed to provide comfort environment in the building such as a commercial establishment, a residence, a hospital, a school or the like. This system may include, but is not limited to, for example, an air conditioner and/or heat pump, a chilled water or brine system, as well a furnace and/or hydronic heating system. Further, a hot water heater may be provided as well. Typically, the air conditioning system would be in operation during the summer season, the furnace would be running in the winter season, and the heat pump would be in operation during both seasons. The length of the cooling and heating seasons would depend on the geographic location and particular application.

A fuel cell 12 is provided for the purpose of delivering electrical power to the HVAC system through electrical lines 13. This arrangement may be such that the fuel cell 12 provides all of the required electrical power to the HVAC system and, in this case, is a primary source of electrical power. On the other hand, the fuel cell 12 may be engaged only during periods of time when the power from the utility is not available, such as during blackouts or power failures, or is being provided only at higher rates, such as during periods of time when an electric grid is heavily loaded or does not have enough capacity. In the latter case, the fuel cell 12 would be a supplemental or emergency source of electrical power provided to the HVAC system 11.

Recognizing that a fuel cell 12 is relatively inefficient in its operation (40-50%) and therefore generates a significant amount of waste heat, provision is made to use the heat generated during operation of the fuel cell 12 for purposes of supplemental heating during periods of time in which the HVAC system is in a heating mode operation, such as when the heat pump or furnace is actuated. Thus, the supplemental heat rejected by the fuel cell 12 and transferred to the climate-controlled space 10, in addition to the heat $Q_1$ provided by the HVAC system 11, is shown by the arrow and the designation $Q_2$.

Figure 2:
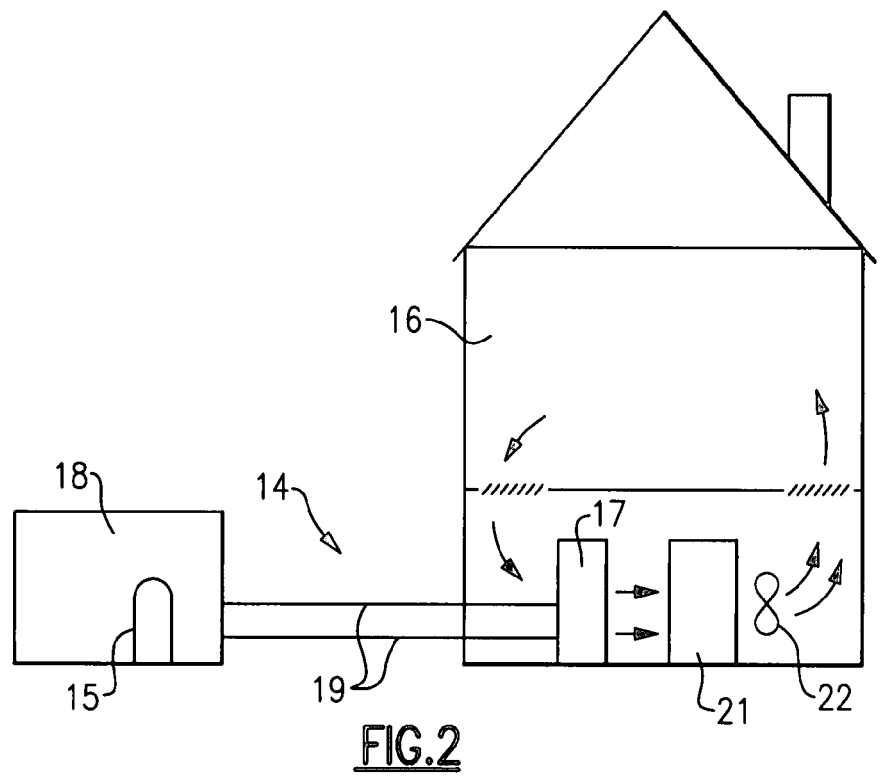
FIG. 2 is a particular embodiment thereof.

FIG. 2 schematically shows an exemplary heat pump system 14 installed in a commercial building or residence 16. The heat pump 14 includes an indoor section typically comprising an indoor heat exchanger assembly 17 and an expansion device (not shown), an outdoor section typically comprising an outdoor heat exchanger assembly 18, a compressor 15 and a filter-dryer (not shown) and refrigerant lines 19 connecting indoor and outdoor sections. In the heating mode of operation, the refrigerant which is circulated within the closed-loop circuit picks up heat at the outdoor heat exchanger and delivers this heat, along with the heat equivalent of compressor power minus some losses, to the indoor heat exchanger as the indoor air is circulated therethrough as indicated by the arrows. A fuel cell 21 is disposed downstream of the indoor heat exchanger 17 such that the air passing through the indoor heat exchanger 17 also passes through the heat rejection portions of the fuel cell 21. This may be accomplished by placing a draw-through air-moving device such as a fan 22 downstream of the fuel cell 21 as shown. In this way, heat from the fuel cell 21 which might otherwise by wasted, is used to supplement the heating mode of operation of the heat pump 14 to thereby raise the efficiency thereof. Further, the supplemental heat provided by the fuel cell 21 would elevate the temperature of the air delivered into the climate-controlled space of the building 16 and reduce or eliminate the occurrence of "cold blow" phenomenon, completely or partially, preventing uncomfortable and undesired conditions for an occupant of the building 16.

It should be pointed out that although the heat pump 14 is shown as a split system comprising the indoor section and the outdoor section, it may also be configured as a packaged unit located outdoors and having supply and return air ducts connected to the climate-controlled space within the building 16. Further, it is not necessary that all the indoor airflow is recirculated within the building. A portion of fresh air may be brought into the building and mixed with the recirculated portion of the air. Obviously, an equivalent portion has to be discharged to the ambient environment to prevent over-pressurization of the building 16. Also, the complete amount of air circulated within the building could be brought in from and discharged to the outdoors.

The fuel cell 12 may be positioned in sequence with the indoor heat exchanger 17 of the HVAC&R system, with respect to the indoor airflow, or arranged in parallel. In the former case, the fuel cell 12 may be located upstream or downstream of the indoor heat exchanger 17, with respect to the indoor airflow.

Moreover, the heat pump 14 may have a different secondary fluid, other then air, delivering heat into the climate-controlled space of the building 16. Such fluid could be, for instance, water or glycol solution circulated by a liquid pump within the pipes. In this case, a special air-moving device may be required to pass air over the fuel cell 12 or the same liquid pump could be utilized to circulate the same secondary loop liquid over the fuel cell 12 to cool the fuel cell 12 and to supplement the heat delivered by the heat pump 14. Similar configurations can be used for the hot water heaters employing fuel cells as the source of electricity.

Even further, the HVAC&R system may have various components utilized for various purposes. Each of these components may have associated fuel cells to provide electricity to these components. Any of these fuel cells may be used to supplement heat provided by other sources, such as heat pumps or furnaces, or be a sole source of heat provided to the climate-controlled space of the building 16. Also, in some applications of air conditioning or refrigeration systems, a precise temperature control is required. In such cases, the heat generated by the fuel cell could be used to trim cooling capacity of the air conditioning or refrigeration system to precisely adjust temperature in the climate-controlled space to a desired setpoint.

Figure 3:
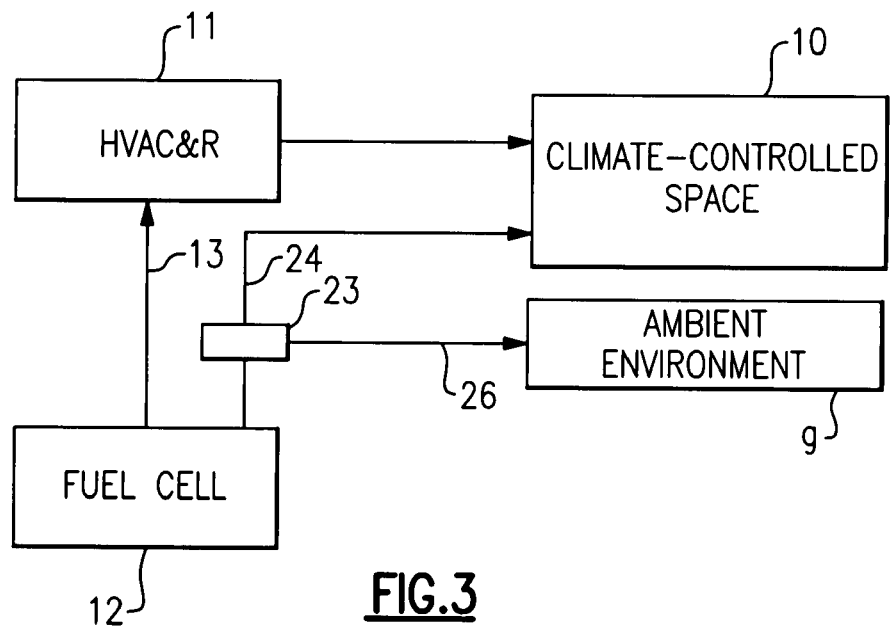
FIG. 3 is a schematic illustration of a modified embodiment thereof.

Shown in FIG. 3 is a variation of the system as described hereinabove wherein a channeling assembly 23 is provided between the fuel cell 12 and the climate-controlled space 10. The channeling assembly 23 is operable to selectively direct at least a portion of the heat from the fuel cell 12 to either a climate-controlled space 10 along the dotted line 24 or to another location, such as ambient environment 9, as indicated by the dotted line arrow 26. In this manner, the precise amount of heat from the fuel cell 12 can be directed to flow to the climate-controlled space 10 only during periods in which it is needed and to an alternate location at all other times.

Figure 4:
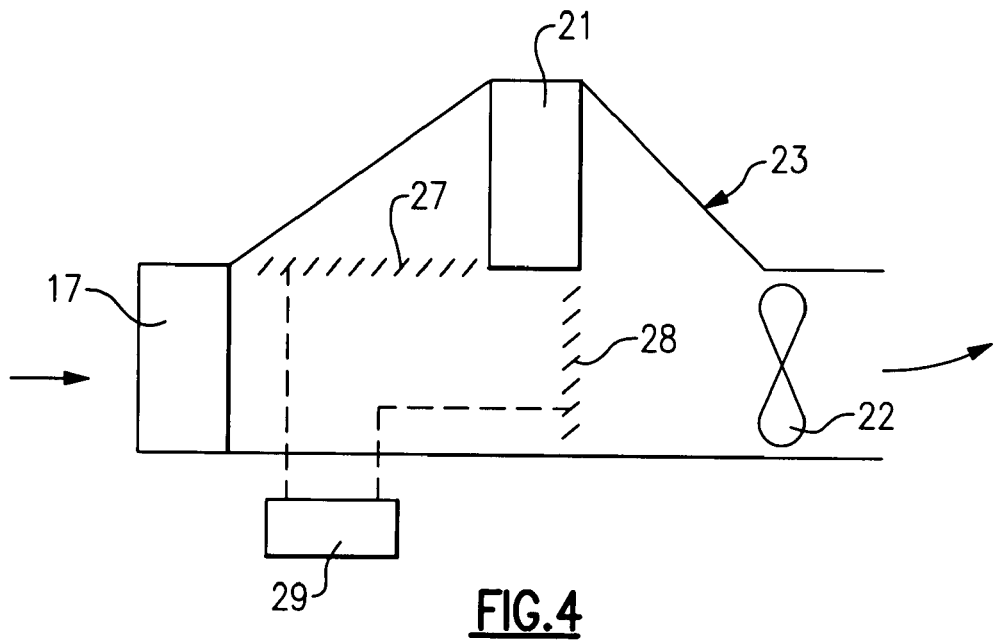
FIG. 4 is a particular illustration thereof.

The particular embodiment of such an arrangement is shown in FIG. 4 wherein the indoor heat exchanger 17 and the fuel cell 21 are no longer directly in line, with respect to the indoor airflow, but are rather arranged in offset positions. Again, the indoor fan 22 is positioned downstream, with respect to the indoor airflow, of both components 17 and 21. In an alternate arrangement, a push-through indoor fan may be positioned upstream of the indoor heat exchanger 17 and the fuel cell 21. A pair of dampers 27 and 28 are provided to selectively control the flow of air by way of a controller 29 which is adapted to modulate the positions of the respective dampers 27 and 28. That is, if damper 27 is placed in the open position and damper 28 is placed in the closed position, all of the air passing through the indoor heat exchanger 17 will pass through the fuel cell 21 and then flow back into the climate-controlled space by the movement of the indoor fan 22. On the other hand, if the damper 27 is closed and the damper 28 is open, the fuel cell 21 will be essentially removed from the indoor airflow path and the HVAC&R system will operate in the usual manner. Of course, the dampers 27 and 28 can also be placed in intermediate positions such that only a portion of the air passing through the indoor heat exchanger 17 will also pass through the fuel cell 21. As known in the art, a pair of dampers 27 and 28 may be replaced by a single damper.

While the present invention has been particularly shown and described with reference to preferred and modified embodiments, it will be understood by one skilled in the art that various changes in detail may be made thereto without departing from the spirit and scope of the invention as defined by the claims.

We claim:

1. A method of providing at least a partial amount of heat to a climate-controlled space comprising the steps of:
   providing a fuel cell for producing electrical power for an HVAC&R system, said fuel cell also producing a substantial amount of heat during operation;
   directing at least a portion of the heat produced by said fuel cell to said climate-controlled space during periods of time in which heat in the climate-controlled space is required, the portion of the heat produced by said fuel cell provided to the climate-controlled space being supplemental to heat provided by said HVAC&R system; and
   providing a channeling assembly which can be selectively modulated to adjust the portion of the heat produced by said fuel cell provided to said climate-controlled space and a portion of the heat produced by said fuel cell provided to an alternate location.

2. The method as set forth in claim 1 wherein said fuel cell is a primary power supply for said HVAC&R system.

3. The method as set forth in claim 1 wherein said fuel cell is a supplementary power supply for said HVAC&R system.

4. The method as set forth in claim 1 wherein said other means includes at least a heat pump or a furnace.

5. The method as set forth in claim 1 wherein said portion of heat provided by said fuel cell to said climate-controlled space is a primary source of heat.

6. The method as set forth in claim 1 wherein said heat directing step is accomplished by way of a fan or a liquid pump.

7. The method as set forth in claim 6 wherein said fan or liquid pump is positioned upstream of the fuel cell.

8. The method as set forth in claim 6 wherein said fan or liquid pump is positioned downstream of the fuel cell.

9. The method as set forth in claim 1 wherein the alternate location is an ambient environment.

10. The method as set forth in claim 1 wherein said channeling assembly comprises at least one damper.

11. The method as set forth in claim 10 wherein said channeling assembly comprises a pair of dampers.

12. The method as set forth in claim 1 wherein said HVAC&R system includes an indoor section and further wherein said fuel cell is positioned sequentially, with respect to indoor airflow, with the indoor section of the HVAC&R system.

13. The method as set forth in claim 12 wherein said fuel cell is positioned upstream of said indoor section of the HVAC&R system.

14. The method as set forth in claim 12 wherein said fuel cell is positioned downstream of said indoor section of the HVAC&R system.

15. The method as set forth in claim 1 wherein said HVAC&R system includes an indoor section and further wherein said fuel cell is positioned in parallel, with respect to indoor airflow, with the indoor section of the HVAC&R system.

16. The method as set forth in claim 1 wherein said portion of heat provided by said fuel cell to said climate-controlled space is used to control temperature in the climate-controlled space during at least one of heating or cooling mode of operation.

17. The method as set forth in claim 1 wherein said fuel cell produces electrical power for at least one subsystem of said HVAC&R system that provides heating to said climate-controlled space.

18. The method as set forth in claim 1 wherein said fuel cell produces electrical power for at least one subsystem of said HVAC&R system that does not provide heating to said climate-controlled space.

19. Apparatus for providing at least a partial amount of heat to a climate-controlled space comprising:
   a fuel cell for producing electrical power for an HVAC&R system, said fuel cell also producing a substantial amount of heat during operation;
   a means for directing at least a portion of this heat from said fuel cell to said climate-controlled space during periods of time in which heat in the climate-controlled space is required, the portion of the heat produced by said fuel cell provided to the climate-controlled space being supplemental to heat provided by said HVAC&R system; and
   a channeling assembly which can be selectively modulated to adjust the portion of heat produced by said fuel cell provided to said climate-controlled space and a portion of the heat produced by the fuel cell provided to an alternate location.

20. The apparatus as set forth in claim 19 wherein said fuel cell is a primary power supply for said HVAC&R system.

21. The apparatus as set forth in claim 19 wherein said fuel cell is a supplementary power supply for said HVAC&R system.

22. The apparatus as set forth in claim 19 wherein said other means includes at least a heat pump or a furnace.

23. The apparatus as set forth in claim 19 wherein said portion of heat provided by said fuel cell to said climate-controlled space is a primary source of heat.

24. The apparatus as set forth in claim 19 wherein said heat directing means are accomplished by way of a fan or a liquid pump.

25. The apparatus as set forth in claim 24 wherein said fan or liquid pump is positioned upstream of the fuel cell.

26. The apparatus as set forth in claim 24 wherein said fan or liquid pump is positioned downstream of the fuel cell.

27. The apparatus as set forth in claim 19 wherein the alternate location is an ambient environment.

28. The apparatus as set forth in claim 19 wherein said channeling assembly comprises at least one damper.

29. The apparatus as set forth in claim 28 wherein said channeling assembly comprises a pair of dampers.

30. The apparatus as set forth in claim 19 wherein said HVAC&R system includes an indoor section and further wherein said fuel cell is positioned sequentially, with respect to indoor airflow, with the indoor section of the HVAC&R system.

31. The apparatus as set forth in claim 30 wherein said fuel cell is positioned upstream of said indoor section of the HVAC&R system.

32. The apparatus as set forth in claim 30 wherein said fuel cell is positioned downstream of said indoor section of the HVAC&R system.

33. The apparatus as set forth in claim 19 wherein said HVAC&R system includes an indoor section and further wherein said fuel cell is positioned in parallel, with respect to indoor airflow, with the indoor section of the HVAC&R system.

34. The apparatus as set forth in claim 19 wherein said portion of heat provided by said fuel cell to said climate-controlled space is used to control temperature in the climate-controlled space during at least one of heating or cooling mode of operation.

35. The apparatus as set forth in claim 19 wherein said fuel cell produces electrical power for at least one subsystem of said HVAC&R system that provides heating to said climate-controlled space.

36. The apparatus as set forth in claim 19 wherein said fuel cell produces electrical power for at least one subsystem of said HVAC&R system that does not provide heating to said climate-controlled space.

* * * * *